2,849,432
POLYMERIZATION OF DIOLEFINES

Richard W. Kibler, Cuyahoga Falls, Francis A. Bozzacco, Massillon, and Lawrence E. Forman, Akron, Ohio, assignors to The Firestone Tire & Rubber Company, Akron, Ohio, a corporation of Ohio No Drawing. Application February 6, 1956
Serial No. 563,448

6 Claims. (Cl. 260—94.2)

This invention relates to the polymerization of conjugated diolefines and mixtures thereof with unsaturated compounds copolymerizable therewith to yield products in which the portions of the polymeric chains derived from the diolefines closely approximate the microstructure of Hevea rubber. Particularly when the diolefines are used in major proportions, and still more particularly when the diolefine employed is isoprene, the products closely approach, in technical properties and fundamental chemical and physical properties, natural Hevea rubber.

For many important uses, natural Hevea rubber is still the most satisfactory material, notwithstanding the extensive developments of synthetic diene rubbers in recent years. Hevea rubber lends itself readily to fabrication processes, having excellent tack and other manipulative properties which facilitate manufacturing operations carried out thereon. Hevea rubber yields vulcanizates which are greatly superior to other diene rubber vulcanizates in point of tensile strength (particularly when the comparison is made with non-reinforced stocks), elongation at break, and low running temperature. These last properties have rendered Hevea rubber indispensable in large heavy duty tires such as truck tires.

These superiorities of Hevea rubber over the synthetic diene polymers heretofore produced appear fundamentally to be due to the extreme regularity of the mode of polymerization of the isoprene residues in Hevea rubber, these residues being almost exclusively in the cis-1,4-addition configuration, i. e. in units having the structural formula $$CH_3-C=C-H$$
$$|\qquad\quad|$$
$$-CH_2\ \ CH_2-$$

disposed along the polymer chain. Conventional synthetic diene polymers contain the diene residues in a variety of other configurations, the cis-1,4-addition mode usually constituting less than one-third of the entire structure.

Accordingly, it is an object of this invention to provide a novel and advantageous method for the polymerization of conjugated diolefines.

Another object is to provide such a process which will result in the production of polymers having superior physical and chemical properties.

A further object is to provide such a process which will produce polymers having fundamental chemical structure and technical properties more closely approaching those of Hevea rubber than has heretofore been possible.

Still another and very specific object is to produce a synthetic polymer of isoprene having fundamental structure and properties closely approaching those of Hevea rubber.

SYNOPSIS OF THE INVENTION

The above and other objects are secured, in accordance with this invention, in a process in which a conjugated diolefine, or a mixture thereof with other unsaturated compounds copolymerizable therewith, is contacted with a lithium dihydrocarbon amide catalyst of the formula

in which formula R, in each occurrence, represents a hydrocarbon group containing from 1 to 40 carbon atoms. The conjugated diolefine (and any copolymerizable compounds) is thereby caused to polymerize and, other factors being equal, the resultant product approaches much more closely to the ideal Hevea-rubber-type properties and structure than with any conventional method of polymerization. Particularly when the diolefine used is isoprene, the resultant polymer approaches quite closely to Hevea rubber in its properties and behavior. The process may be carried out by mass polymerization techniques, in which the diolefine, in substantially undiluted form, is contacted with the lithium dihydrocarbon amide catalyst (I) or by solution techniques, in which the diolefine is dissolved in suitable solvents and contacted with the catalyst. The temperature may vary over a wide range, say from 0° C. or lower to 150° C. or higher. The diolefines may be in liquid or vapor phase, depending on the temperature and pressure employed.

THE LITHIUM DIHYDROCARBON AMIDE CATALYSTS

As noted above, these may be any compounds of the Formula I as above defined. Hydrocarbon radicals which may occupy the positions indicated by R may be any hydrocarbon radicals containing from 1 to 40 carbon atoms, such as alkyl and cycloalkyl groups on the order of methyl, ethyl, propyl, isopropyl, butyl, isobutyl, t-butyl, the various pentyl groups, n-hexyl, cyclohexyl, 2-ethylhexly, nonyl, decyl, undecyl and dodecyl groups, the mixed alkyl radicals derived by the reduction of the fatty acid radicals of natural fats such as coconut oil, tallow, etc., hexadecyl, octadecyl, eicosyl, heneicosyl groups and the like; and aryl, aralkyl and alkaryl groups such as phenyl, benzyl and phenylethyl groups, the various tolyl and zylyl groups, alpha- and beta-naphthyl groups, xenyl groups and the like. It will be understood that the radicals R in Formula I need not both be the same, but may be different radicals individually meeting the criteria set forth; and that the catalyst need not be a pure compound but may be a mixture of lithium amides individually having the Formula I.

The lithium di-hydrocarbon amide catalyst (I) may be prepared by known reactions. A convenient synthesis is by the reaction of a hydrocarbon lithium, say n-amyl lithium, with an appropriate secondary amine in accordance with the equation (1) 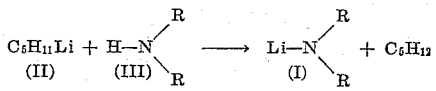

the radicals R being as defined hereinabove. The reaction is easily carried out at room or slightly elevated temperature in closed containers of non-reactive materials such as glass, stainless steel, or the like.

The lithium di-hydrocarbon amide catalyst of this invention may be used alone or in conjunction with other lithium-based catalysts. It has been discovered, in an investigation with which the present applications were associated, that finely divided metallic lithium, lithium hydrocarbon compounds, and the like catalyze the polymerization of conjugated diolefines to yield products having the desirable Hevea-rubber-type microstructure referred to hereinabove. The catalysts of this invention may be used along with such lithium-dependent catalysts.

In fact, a certain amount of the hydrocarbon lithium such as the amyl lithium (II) of Equation 1 above is very possibly present in all preparations made by way of that reaction.

As to the amount of catalyst, the larger the amount of catalyst, the more rapidly the polymerization will proceed and the lower will be the molecular weight of the product. In general, there should be employed an amount of catalyst such as to contain from about 0.001 to about 1.0 gram of lithium element (present as the lithium in the lithium amide

(I)) for each 100 grams of monomer.

THE DIOLEFINES EMPLOYED

Diolefines suitable for use in this invention include (the preferred) isoprene, butadiene, 2-methyl-1,3-pentadiene, 2,3-dimethyl butadiene, cyclopentadiene, and the like. It will be understood that mixtures of diolefines indicated as being satisfactory may also be used.

The diolefines employed in this invention should be of a high degree of purity for use in the practice of this invention. By high purity is meant that the diolefine should be of at least more than 90 mole percent purity and preferably in the neighborhood of 95 or more mole percent purity. In general, the purer the diolefine, the faster the reaction rate and the closer the structure and the properties of the resulting polymer to natural rubber. Acetylenic compounds, or other compounds containing reactive hydrogen which tend to reduce the effective catalyst concentration or to act as chain terminators, should be kept at a minimum or removed prior to use, since they use up catalyst and also tend to lower the molecular weight of the resulting polymer. Any inhibitor normally present in a commercial diolefine must be removed by conventional techniques prior to polymerization in accordance with the invention.

Excellent polymers in accordance with the invention are produced from pure grade [1] or research grade [2] isoprene. The only purification required of these monomers prior to use is removal of inhibitor therefrom. Desirable polymers in accordance with the invention are also produced from a less pure grade of isoprene [3] which has a purity of about 91–93% and contains minor amounts of alkyl acetylenes and various other unsaturates, provided the acetylenic compounds are removed and the unsaturated impurities are reduced by well known chemical and fractionating methods to produce a monomer having a purity of about 95% and an index of refraction at 20° C. in the range of about $n_D^{20}=1.4210$ to 1.4220. A final refinement which has been found particularly suitable consists in refluxing the isoprene with sodium or other alkali metal sand, and then distilling the isoprene away from the sand.

Moisture in the polymerization zone, since it tends to use up catalyst, should be kept at a minium. Oxygen and other components of the atmosphere have been found to inhibit polymerization and consequently should as nearly as possible be kept out of the reaction zone. To this end it is desirable that the diolefines be handled at all times in contact only with their own vapors or with atmospheres containing only their own vapors and inert gases such as helium or argon. Particularly to be avoided is the presence of oxygenated and nitrogenous organic compounds such as ethers, esters, amines and the like, which are sometimes considered to be indispensable constituents of alkali-metal-based catalyst systems: these compounds should be rigorously excluded from the reaction mixtures of this invention.

THE SOLVENT

Any solvents used in the process of this invention must be non-polar, non-acidic organic solvents. Suitable solvents included the saturated aliphatic hydrocarbon solvents such as the straight and branched-chain paraffins and cycloparaffins containing from 3 to 16 carbon atoms, exemplified in propane, pentane, hexane, heptane, dodecane, petroleum ether, cyclopentane, cyclohexane, methyl cyclohexane and the like. The same considerations as to purity and absence of interfering compounds apply to the solvent as to the monomeric diolefine. A treatment which has been found particularly advantageous for the purification of paraffin solvents such as petroleum ether consists in agitating them with concentrated sulfuric acid, and thereafter repeatedly washing them with water. The solvents may then be dehydrated by passage through a silica gel, alumina, calcium chloride or other dehydrating and adsorbing column, and thereafter distilling. Similarly as in the case of the isoprene, the solvent after purification should be handled in contact only with its own vapor or with atmospheres containing only its vapor and inert gases such as helium or argon.

COMONOMERS

As noted above, in addition to being polymerized alone, the diolefines may also be copolymerized with minor proportions of other unsaturated compounds. In general, it is preferred that the copolymerized compounds should constitute not over 25%, based on the total weight of the diolefine plus the copolymerized compounds, as such polymers approach closest to the properties of Hevea rubber. However, in any copolymers produced by the process of this invention and containing a significant amount, say 10% or more, of a diolefine, the diolefine-derived portion of the polymer chain will possess a microstructure containing substantially more of the desirable cis-structure, and will exhibit properties distinguishing it from comparable conventionally produced polymers. Compounds suitable for copolymerization with diolefines in the practice of this invention include polymerizable ethylenically unsaturated compounds such as styrene, alpha-methyl styrene, and the like. The comonomers should be free of ether, nitrile, nitro and other highly negative groups. It will be understood, of course, that the same rigid standards for purity should be maintained for the comonomers as for the diolefine and solvent.

POLYMERIZATION AND POLYMER RECOVERY OPERATIONS

For small scale laboratory preparations, the polymerization reactions may conveniently be carried out in glass bottles sealed by crown caps lined with aluminum foil or other flexible, inert sheet material. Before use, the bottles should be dried, for instance by flaming and flushing with helium, argon or other inert gas. It is often desirable, even though the isoprene and solvent (if used) have been previously purified, to subject the materials to a last purification before charging, as for instance by passage through a silica gel adsorption column during the charging. Preferred solvents are aliphatic and aromatic hydrocarbon solvents such as pentane, hexane, heptane, petroleum ether, benzene, cyclopentane and the like. An atmosphere of inert gas such as helium, argon or the like is preferably maintained in the bottle during the charging, to avoid contact of oxygen with the monomer, and it will usually be desirable to complete the purging of oxygen from the system by allowing a portion of the isoprene to evaporate with the bottle loosely capped. The catalyst, which will usually be in the form of a readily flowable solution or suspension of the lithium amide, is usually introduced last, just before sealing the crown cap. A

---

[1] Supplied by Phillips Petroleum Company, Bartlesville, Oklahoma and represented as having a purity of 99 mole percent and a refractive index at 20° C. of $n_D^{20}=1.422$.
[2] Supplied by Phillips Petroleum Company and represented as having a purity of 99.6 mole percent and a refractive index at 20° C. of $n_D^{20}=1.422$.
[3] Supplied by Enjay Company, Inc.

hypodermic syringe is a convenient instrument for the handling of the catalyst, since it will keep the catalyst out of contact with the atmosphere. The sealed bottle may either be placed on a polymerizer wheel, arranged to dip and revolve the bottle in a water bath at the desired polymerization temperature; or, after brief shaking or other agitation to mix the catalyst with the other ingredients, the bottle may be allowed to stand quiescent in a medium maintained at the desired polymerization temperature. The polymerization will usually be complete in from 3 to 60 hours, depending on the temperature, catalyst concentration and other pertinent conditions. It is usually necessary to cut open the bottle to remove the polymer. Since the polymer contains no antioxidants, it is extremely susceptible to oxidation. A preferred method of shielding the polymer from oxidation consists in dropping it into a methanol, isopropanol, acetone or other organic solvent solution of an antioxidant and agitating the mixture. The alcohol serves as a vehicle for distributing the antioxidant, as an agent to destroy the catalyst, and causes the polymer to separate out from any solvent used in the polymerization mass. The separated polymer is then preferably washed with water on a roll mill, usually with addition of further stabilizing agents, and dried.

Corresponding techniques should be used in large scale polymerizations according to this invention. Usually the reaction will be carried out in a closed autoclave provided with a heat-transfer jacket and with a rotary agitator. Avoidance of oxygen contamination is most easily secured by evacuating the vessel prior to charging the isoprene and solvent (if used) and evaporating and venting a portion of the charge to sweep out any traces of oxygen present. As a precaution for the purity of the monomer and solvent, a silica gel or other suitable adsorption column is preferably inserted in the charging line for these materials. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature which will usually be maintained between 0° and 150° C., preferably between 30° and 80° C. Upon completion of the polymerization, the polymerization mass is removed, immersed under the surface of a body of methanol, isopropanol or other alcohol containing an antioxidant, and agitated therewith to precipitate the polymer, destroy the catalyst and incorporate the antioxidant. The precipitated mass may be milled with water on a wash mill to remove the alcohol, additional antioxidant being incorporated during this operation. The product is then dried for storage and use.

Another method for the recovery of the polymer from the solution thereof in a reaction solvent consists in introducing the solution into an agitated body of water heated to a temperature above the boiling point of the solvent. The solvent is flashed off, leaving the polymer as a crumb which may be removed from the water by filtration and dried.

THE INFRA-RED DATA

The data given hereinbelow as to the proportions of cis-1,4-; trans-1,4-; 1,2- and 3,4-additions in the products of this invention were determined by infra-red analysis. The relative amounts of the four structures named are found by means of measuring the intensities of the infra-red absorption bands at 8.85, 8.68, 10.98 and 11.25 microns for the four types of structures in the order given, and inserting these values into the equation:

$$D^i = e_1^i C_1 + e_2^i C_2 + e_3^i C_3 + e_4^i C_4$$

where:

$D^i$ = absorbance (optical density) of the polymer at wavelength $i$ $e^i_{1, 2, 3,}$ or $_4$ = the absorptivities of the several structures at wavelength $i$, the subscripts 1, 2, 3 and 4 referring to the several component structures, and $C_{1, 2, 3}$ or $_4$ = the concentrations of the several structures, the subscripts 1, 2, 3 and 4 referring to the several component structures.

The four equations obtained in this way are solved for $C_1$, $C_2$, $C_3$ and $C_4$, the values of the concentrations of the cis-1,4-, trans-1,4-, 1,2-addition and 3,4-addition components of the polymer.

The peak wavelengths selected, and the values of the absorptivities $e^i$ for these wavelengths for the several structures, are tabulated herewith:

|  | Molar absorptivities $e^i$ at wavelength of— | | | |
| --- | --- | --- | --- | --- |
|  | 8.68 microns | 8.85 microns | 10.98 microns | 11.25 microns |
| 1,2-addition | 3.531 | 3.531 | 149.0 | 10.199 |
| 3,4-addition | 1.541 | 1.815 | 7.363 | 145.0 |
| Cis-1,4-addition | 3.583 | 6.518 | 1.860 | 1.530 |
| Trans-1,4-addition | 5.927 | 1.934 | 2.277 | 1.835 |

Percentage values for the various types of addition products, based on the total polymer, are derived by dividing the absolute concentration of each type of component by the sum of the concentrations of the four types of components (1,2-; 3,4-; cis-; and trans-) determined and multiplying by 100%, so that the sum of the percentages given will always be 100%. In order to assess the accuracy of the determination, total unsaturation is found; this is the quotient of the sum of the concentrations of the various components found by infra-red analysis, divided by the concentration of the solution used in the analysis which is found by determining the total solids.

With the foregoing general description in mind, there are given herewith detailed examples of the practice of this invention. All parts given are by weight.

*Example*

(A) Preparation of catalyst:
Lithium dispersion (35% dispersion in white petroleum) _____ grams__ 19.8
n-Pentane _____ ml.__ 500
1-chloropentane _____ grams__ 53.2
Diphenylamine _____ do__ 42.5

The apparatus used for the preparation consisted of a one-liter flask provided with a high speed stirrer and with means for introducing helium to keep the apparatus purged free of air. Likewise there was provided a dropping funnel for the introduction of liquid reactants.

The lithium dispersion and n-pentane were introduced into the flask, stirring was commenced, the temperature adjusted to 0° C., and the 1-chloropentane introduced through the dropping funnel as rapidly as was consistent with the maintenance of this temperature, the addition requiring about 40 minutes. The stirring was continued for a further 20 minutes to insure completion of the reaction. The temperature was then raised to 18° C. and the diphenylamine slowly added. The stirring was continued for an additional 6 hours after the addition of the diphenylamine, the final product being a dark purple suspension of lithium diphenylamide. The product was then pressured by means of helium into a storage bottle which had previously been flamed, and flushed with helium.

(B) Polymerization:     Grams
Petroleum ether (washed with $H_2SO_4$ and thereafter with water, and finally dried) _____ 300
Isoprene (Phillips Petroleum Co. research grade: refluxed over sodium sand and distilled) _____ 100
Lithium diphenylamide suspension (prepared as just described) _____ [1].02 or .04

[1] As lithium combined in lithium diphenylamide.

Two runs were made in accordance with the foregoing schedule, one using 0.02 and the other 0.04 gram of lithium in the catalysts. In each run the isoprene and petroleum ether were mixed and passed through a 15-inch silica gel column into a 28-ounce beverage bottle which had previously been flamed and purged with helium. The lithium diphenyl amide catalyst was then added and the bottle capped and swirled to insure even dispersion of the ingredients, and allowed to stand for 18 hours. The bottle was then cut open and the polymer precipitated from the solution by stirring with isopropanol containing 3% of mercaptobenzimidazole as an antioxidant. The precipitated curd was washed with water on a wash mill and dried at 50° C. in a vacuum oven for 24 hours. The two runs yielded products having the following properties.

TABLE I

| Amount of catalyst (grams) | Intrinsic viscosity | Microstructure indicated by infra-red analysis | | | | |
|---|---|---|---|---|---|---|
| | | Percent cis- | Percent trans- | Percent 1,2- | Percent 3,4- | Total found |
| 0.02 | 5.74 | 86.1 | 5.0 | 0 | 8.8 | 82.7 |
| 0.04 | 3.00 | 73.9 | 17.1 | 0 | 8.8 | 90.6 |

From the foregoing general discussion and detailed specific examples, it will be evident that this invention provides a novel method for the polymerization and copolymerization of conjugated diolefines to yield products closely approaching Hevea rubber in chemical microstructure and physical properties. The process requires only simple and inexpensive equipment and materials, and only a minimum of skilled technical supervision.

What is claimed is:

1. Process of polymerizing a substance selected from the group consisting of conjugated diolefines and mixtures thereof with other unsaturated compounds free of highly negative groups copolymerizable therewith, which comprises contacting said selected substance with a lithium dihydrocarbon amide in which the hydrocarbon groups contain from 1 to 40 carbon atoms.

2. Process of polymerizing isoprene which comprises contacting isoprene with a lithium dihydrocarbon amide in which the hydrocarbon groups contain from 1 to 40 carbon atoms.

3. Process of polymerizing a substance selected from the group consisting of conjugated diolefines and mixtures thereof with other unsaturated compounds free of highly negative groups copolymerizable therewith, which comprises contacting said selected substance at a temperature of from 30° to 80° C. with a lithium dihydrocarbon amide in which the hydrocarbon groups contain from 1 to 40 carbon atoms.

4. Process of polymerizing a substance selected from the group consisting of conjugated diolefines and mixtures thereof with other unsaturated compounds free of highly negative groups copolymerizable therewith, which comprises contacting said selected substance with lithium diphenylamide.

5. Process of polymerizing isoprene, which comprises contacting isoprene with lithium diphenylamide.

6. Process of polymerizing isoprene, which comprises contacting isoprene at a temperature of from 30° to 80° C. with lithium diphenylamide.

References Cited in the file of this patent

FOREIGN PATENTS 339,243     Great Britain     Dec. 1, 1930

OTHER REFERENCES

"Industrial and Engineering Chemistry," vol. 48, No. 4, April 1956, pp. 778–791.

"Chemical and Engineering News," April 30, 1956, p. 2187.